(No Model.) 2 Sheets—Sheet 1.

C. A. WESTERVELT & J. P. WALTERS.
CENTRIFUGAL AND CENTRIPETAL LUBRICATOR.

No. 532,617. Patented Jan. 15, 1895.

Witnesses
C. W. Smith
Geo. M. Whitney

Inventors
Charles A. Westervelt
James P. Walters
by ———— Attorney

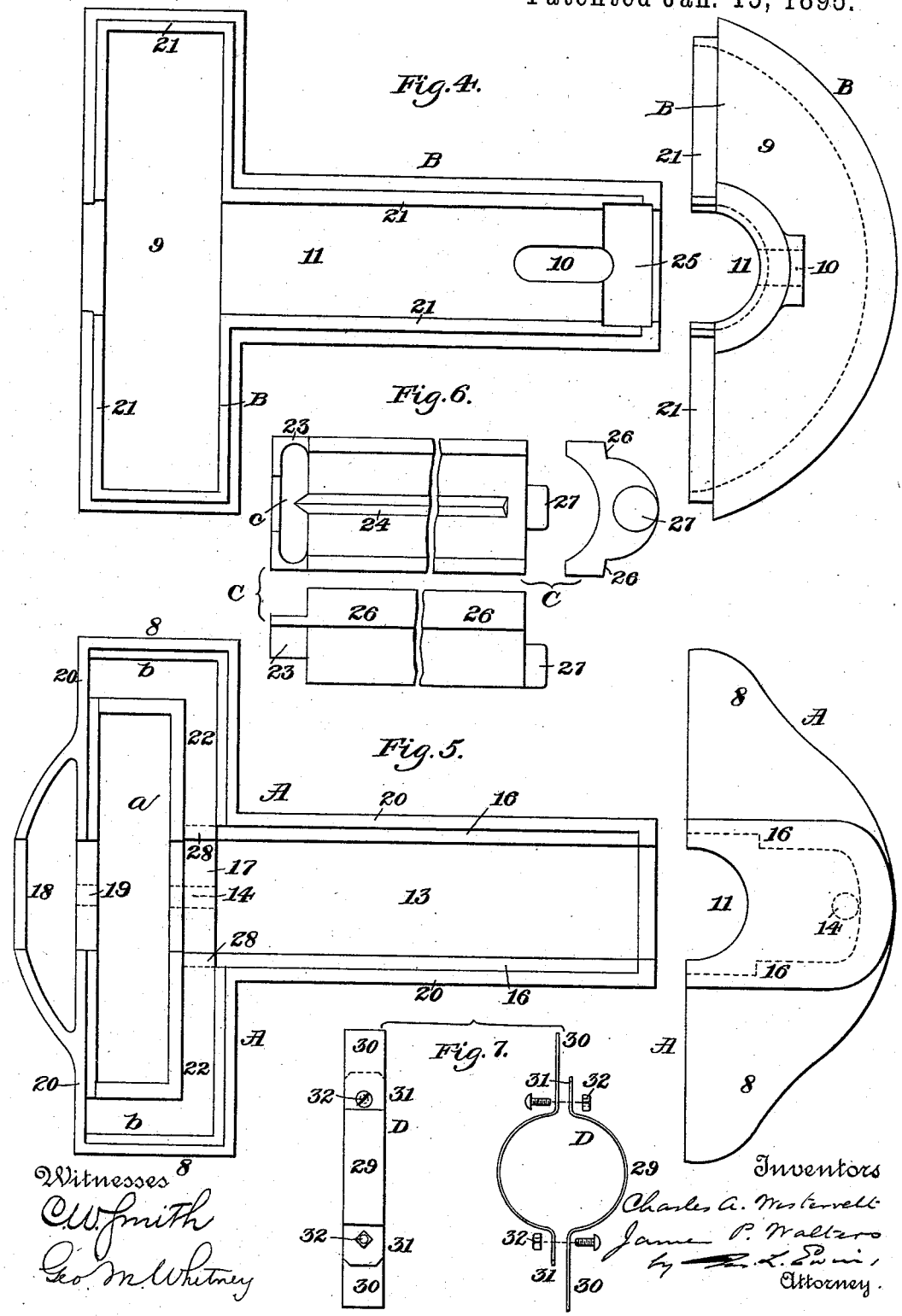

UNITED STATES PATENT OFFICE.

CHARLES A. WESTERVELT AND JAMES P. WALTERS, OF UHRICHSVILLE, OHIO.

CENTRIFUGAL AND CENTRIPETAL LUBRICATOR.

SPECIFICATION forming part of Letters Patent No. 532,617, dated January 15, 1895.

Application filed July 20, 1894. Serial No. 518,143. (No model.)

*To all whom it may concern:*

Be it known that we, CHARLES A. WESTERVELT and JAMES P. WALTERS, citizens of the United States of America, and residents of Uhrichsville, Tuscarawas county, in the State of Ohio, have invented a new and useful Improvement in Centrifugal and Centripetal Lubricators, of which the following is a specification.

This invention relates to improvements in means for automatically and economically lubricating horizontal line-shafting, rotary axles, and the like, and in devices for rendering such lubricators automatic by providing for the employment of a suitable oil or other liquid lubricant, hereinafter termed the "oil," and for keeping such oil in circulation within the bearing or box while the shaft or axle is in motion, and effectively applying the same to the surfaces to be lubricated, by utilizing centrifugal and centripetal forces within the journal-bearing or axle-box.

Heretofore in such self-lubricating journal-bearings, as they are commonly termed, it has been attempted to throw the lubricant centrifugally by means of a revolving oil-elevator into pockets above the level of the shaft or axle, and to apply the lubricant to the top of the journal; and in order to faciliate such elevation of the lubricant the substitution of "soft-soap and water" for oil has been proposed. We proceed on a different principle, and locate such pockets on a level with the shaft or axle, conducting the oil centripetally therefrom by horizontal or substantially horizontal passages, and applying the oil to the bottom or sides of the journal in all cases. We thus provide for using ordinary lubricating oils, or any other lubricant that is at all liquid, and for the effective circulation of the same at low speeds as well as at ordinary and high speeds. We also thus provide for applying the oil to the shaft or axle by means of a subjacent brass, of simple construction, having open-topped oil-containing recesses which are readily inspected and cleared in case of obstruction, and for utilizing the oil-distributing capacity of the periphery of the shaft or axle itself.

Our present invention consists in the combination with the shaft or axle, hereinafter termed the "shaft," of certain novel combinations of peculiarly constructed and arranged parts, hereinafter set forth and claimed.

Two sheets of drawings accompany this specification as part thereof.

Figure 1:
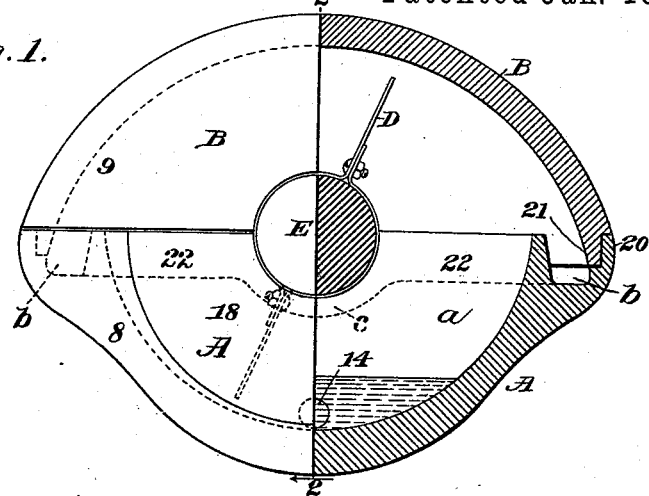
Figure 2:
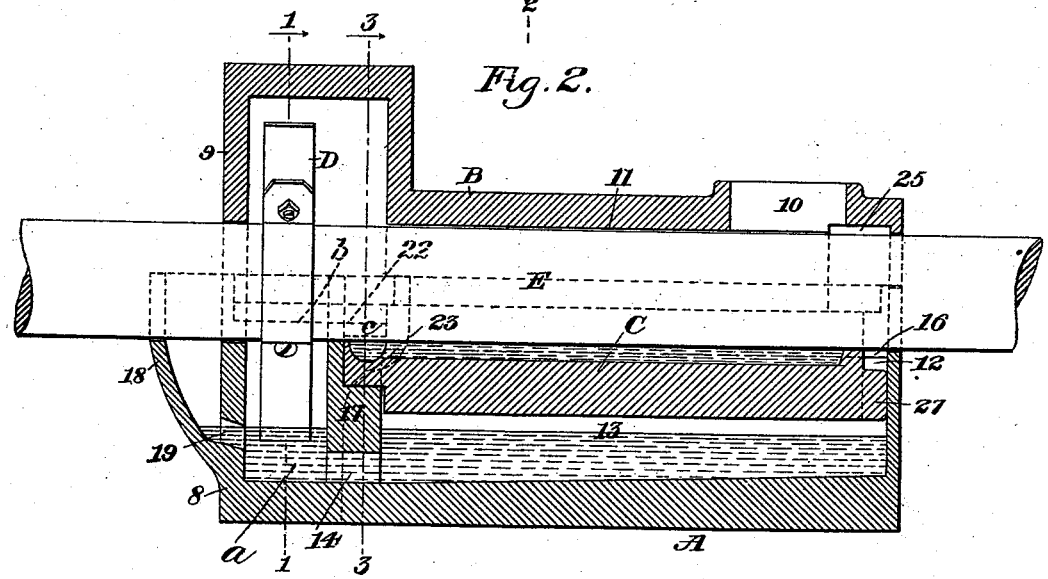
Figure 3:
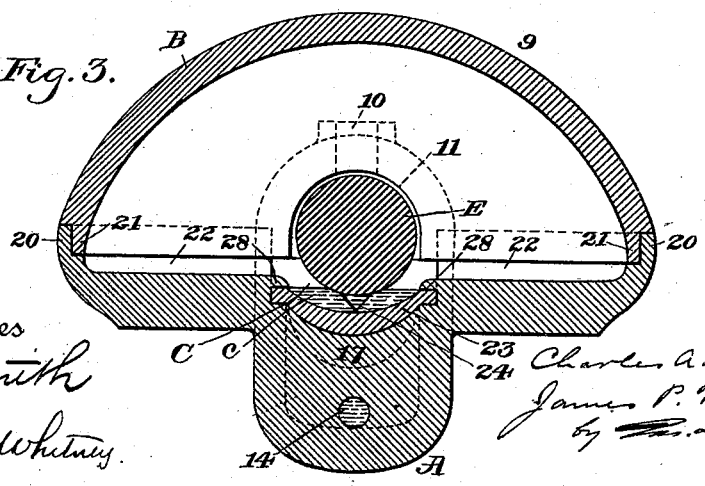

On Sheet 1, Figure 1 represents an end view, half in vertical section, of a journal-bearing for line-shafting embodying the present improvement in centrifugal and centripetal lubricators. Fig. 2 represents a longitudinal section on the line 2—2 Fig. 1, with the shaft and oil-elevator in elevation; and Fig. 3 represents a cross-section on the line 3—3 Fig. 2. On Sheet 2, Figs. 4 to 7 inclusive represent detail views of the respective parts, including said oil-elevator, as hereinafter more particularly described.

Like letters and numbers refer to like parts in all the figures.

The shell of the improved journal-bearing is horizontally bisected, being composed of suitably recessed lower and upper shell-parts, A and B, and it is furnished internally with a brass, C, of a suitable alloy, and an oil-elevator, D, which is shown as made in two parts in the form of a double paddle.

The shell-parts A and B may be castings of iron or other suitable metal, and may be clamped together in any approved way within a hanger or pedestal or upon the frame of any piece of machinery; and the oil-elevator D may be fastened on the shaft E by any suitable means.

When the parts are united, as in Figs. 1, 2, and 3, the shaft E carries the oil-elevator D within a housing which is preferably formed by end-enlargements 8 and 9 on the respective shell-parts, and the brass C located within the lower shell-part A provides for applying the oil to the bottom of the journal. A supply of oil is introduced through an oil-inlet 10 in the top of the shell-part B communicating directly with the main-bore 11 of the bearing, and by way of an end-space 12 at the rear end of the brass C with an oil-well 13 beneath the brass C from which the oil flows through an aperture 14 into an oil-chamber $a$ within said housing at bottom. As the oil-elevator D revolves, it carries upward the oil from the oil-chamber $a$ and discharges it centrifugally into oil-pockets *b*, hereinafter termed "side-pockets," at the sides of the housing, which extend across the plane in which the oil-elevator revolves on a level with the shaft, and receive a sufficient quantity of the oil so elevated directly from the oil-elevator D, without any deflection thereof. Such oil as is thrown against the internal top of said housing flows down its declivities into one or the other of said side-pockets. From said side-pockets the oil flows centripetally to or toward the shaft E through horizontal or substantially horizontal oil-passages 22, hereinafter termed "horizontal passages" or "centripetal passages," which, in common with said side-pockets *b*, are conveniently open-topped, and formed within the end-enlargement 8 of the lower shell-part A at its top. Said horizontal passages 22 discharge at their inner ends into a transverse oil receptacle *c* within an end-projection 23 formed on the brass C, and from said oil-receptacle *c* a distributing groove 24 in the same plane extends longitudinally of the brass, and brings the oil into contact with the shaft along its bottom; said receptacle *c* and groove 24 constituting together what are elsewhere termed herein "open-topped oil-containing recesses." From thence the oil is effectively distributed to all parts requiring lubrication by the periphery of the shaft itself.

The lower shell part A, face and end views of which are shown in Fig. 5, in addition to said end-enlargement 8 provided with said oil-chamber *a*, side-pockets *b* and horizontal passages 22, and in addition to said oil-well 13 and aperture 14, is constructed with internal shoulders 16 and an end-bolster 17 to support the brass C, an oil-escape guard 18 external to its front wall, connected with said chamber *a* by a return passage 19, and high joint-flanges 20 on all sides of the enlargement 8 and at the sides of the longitudinal portion of the shell-part to coact with depending joint-flanges 21 on the upper shell-part B to form sufficiently oil-tight joints between the two shell-parts; also, in the drawings, with lips 28 at the inner ends of said horizontal passages 22 to overhang the lateral edges of said end-projection 23 of the brass C containing said oil-receptacle *c*, so as to insure the flow of the oil into the latter. See Fig. 3.

The upper shell-part B, face and end views of which are represented by Fig. 4, comprises said end-enlargement 9 forming the top of said housing of the oil-elevator in the shape of an arched hood, and covering said oil-chamber *a*, side-pockets *b* and horizontal passages 22 within the lower shell-part A. It is further constructed with said oil-inlet 10, and the upper part of said main bore 11, and with a bore-enlargement 25 at its rear end to coact with said end-space 12 within the lower shell-part for the prevention of the escape of oil at this end, and also to provide for the flow of oil directly into the well 13 from the oil-inlet 10. See Fig. 2.

The brass C, face, end and edge views of which are shown in Fig. 6, is constructed, in addition to said oil-receptacle *c* and oil-distributing groove 24, with lateral projections 26 to rest on said internal shoulders 16 in the lower shell-part A, and with an end-projection 27 to coact with the rear wall of said shell-part A, as in Fig. 2, to form said end-space 12, and to keep said oil-receptacle *c* in line with said horizontal passages 22.

The oil-elevator D, side and edge views of which are shown in Fig. 7, is composed of a pair of metallic pieces, preferably of one and the same shape, which form together a shaft-embracing collar, marked 29 in this figure, a pair of radial blades 30, and a pair of lap-joints 31 fastened by bolts and nuts 32, by way of illustration.

Revolving oil-elevators of other forms may be substituted for the specific oil-elevator D above described, in connection with the remainder of the improved bearing or material parts thereof. The line 1—1 Fig. 2 may represent the middle plane of a double-ended bearing with one or more central oil-elevators at midlength and a space 12 at each end. The improved journal-bearing may be adapted to be used in connection with a sight-feed lubricator or the like if preferred in the manner set forth in our companion specification forming part of an application for patent filed the 4th day of April, 1894, Serial No. 506,339. The external shape of the bearing may be varied to suit different forms of hangers, pedestals, &c., or as different manufacturers may prefer; and other like modifications will suggest themselves to those skilled in the art.

By the location of the side-pockets B on a level with the shaft, and thus obviating lifting the oil to an unnecessary height, we provide for the use of ordinary liquid lubricants, and for the effective lubrication of the shaft at low speeds as well as at ordinary and high speeds as aforesaid, and also obviate providing the bearing with additional parts for the distribution of the oil from above the shaft as heretofore attempted. By the location of said side-pockets within the lower shell-part, the construction of the bearing as a whole is greatly simplified; casting each shell-part in one piece is facilitated; and the shaft is more effectively lubricated with a given supply of oil at low speeds. This feature is not however to be read into all our claims herein, but only as therein expressly stated; and we do not limit our respective claims to details of mechanical construction hereinbefore mentioned and not necessarily called for by the terms of the claims.

Having thus described the said improvement, we claim as our invention and desire to patent under this specification—

1. In combination with an oil-elevator revolving with the shaft, a housing for said oil-elevator having open-topped oil-pockets within it at its sides, on a level with the shaft, into which the oil is thrown centrifugally by said oil-elevator, and horizontal passages leading from such side-pockets through which the oil flows centripetally to the shaft, substantially as hereinbefore specified.

2. In a self-lubricating journal-bearing, the combination, substantially as hereinbefore specified, of a revolving oil-elevator carried by the shaft, and a horizontally bisected shell provided with a housing for said oil-elevator, and including a lower shell-part having open-topped oil-pockets at the sides of said housing on a level with the shaft, into which the oil is thrown centrifugally by said oil-elevator, and open-topped horizontal passages leading from such side-pockets, through which the oil flows centripetally to the shaft.

3. In a self-lubricating journal-bearing, the combination, substantially as hereinbefore specified, of a revolving oil-elevator carried by the shaft, a horizontally bisected shell provided with a housing for said oil-elevator, and including a lower-shell-part having open-topped oil-pockets at the sides of said housing on a level with the shaft into which the oil is thrown centrifugally by said oil-elevator and open-topped centripetal passages leading from such side-pockets, and a brass supported beneath the shaft within said lower shell-part and provided with open-topped oil-containing recesses into which said centripetal passages discharge.

4. The combination, in a self-lubricating journal-bearing, of a lower shell-part having an oil-chamber, open-topped oil-pockets at the sides of said chamber on a level with the shaft, open-topped centripetal passages leading from such side-pockets, and an oil-well in communication with said chamber, an upper shell-part completing the housing of said oil-elevator, forming a cover above said pockets and passages, and provided with an oil-inlet at top and a bore-enlargement in communication with said oil-inlet and said oil-well, a brass supported beneath the shaft within said lower shell-part and provided with open-topped oil-containing recesses comprising an oil-receptacle into which said centripetal passages discharge, and with a space-forming end-projection, and an oil-elevator revolving within said housing, elevating the oil as it flows thereto and discharging it centrifugally into said side-pockets, from which it flows centripetally to the shaft, substantially as hereinbefore specified.

CHARLES A. WESTERVELT.
JAMES P. WALTERS.

Witnesses:
J. A. BORKLEY,
J. A. VAN OSTRAN.